United States Patent [19]

Shirasaki et al.

[11] 4,442,424
[45] Apr. 10, 1984

[54] METHOD AND SYSTEM FOR DISPLAYING VEHICLE OPERATING PARAMETERS IN A VARIABLE FORMAT

[75] Inventors: Shinji Shirasaki, Kariya; Yoshihiko Tsuzuki, Anjyo; Yuzi Hirabayashi, Aichi; Hiroshi Okazaki, Okazaki; Masahiro Matsuyama, Kariya; Masanobu Kobayashi, Kariya; Yoji Ito, Kariya, all of Japan

[73] Assignee: Nippondenso Company, Limited, Kariya, Japan

[21] Appl. No.: 271,936

[22] Filed: Jun. 9, 1981

[30] Foreign Application Priority Data

Jun. 11, 1980 [JP] Japan .................................. 55-79298
Aug. 21, 1980 [JP] Japan ................................ 55-115695

[51] Int. Cl.³ .............................................. B60Q 1/00
[52] U.S. Cl. .................... 340/52 F; 340/521; 340/691; 340/701; 340/715; 340/731
[58] Field of Search ................. 340/52 F, 521, 701, 340/703, 715, 721, 724, 731, 747; 364/424, 556

[56] References Cited

U.S. PATENT DOCUMENTS

| | | |
|---|---|---|
| 3,437,873 | 4/1969 | Eggert ............................ 340/731 X |
| 3,469,252 | 9/1969 | Bet ..................................... 340/715 |
| 3,474,438 | 10/1969 | Lauher ........................... 340/732 X |
| 3,659,283 | 4/1972 | Ophir .................................. 340/731 |
| 3,739,369 | 6/1973 | Bunker et al. .................. 340/715 X |
| 3,866,166 | 2/1975 | Kerscher et al. ................. 340/52 F |
| 3,868,673 | 2/1975 | Mau, Jr. et al. ............... 340/723 X |
| 3,870,818 | 3/1975 | Barton et al. ................ 340/52 F X |
| 4,001,807 | 1/1977 | Dallimonti ..................... 340/525 X |
| 4,109,235 | 8/1978 | Bouthors .......................... 340/52 F |
| 4,247,843 | 1/1981 | Miller et al. .................... 340/721 X |
| 4,295,135 | 10/1981 | Sukonick ........................ 340/731 X |
| 4,314,244 | 2/1982 | Demke et al. ...................... 340/731 |

Primary Examiner—David L. Trafton
Assistant Examiner—Joseph Nowicki
Attorney, Agent, or Firm—Cushman, Darby & Cushman

[57] ABSTRACT

A plurality of engine operating parameters and useful information items are monitored by respective sensors. A control unit receives signals from the sensors to display the monitored items in a varible format on a single viewing screen in accordance with the conditions of the monitored items. Abnormal condition of the monitored items is detected by the control unit to enlarge the display format to give an warning indication. A pushbutton is provided for each of the monitored items to generate a display command signal in response to a manual command to provide a display of a desired item in an enlarged format.

17 Claims, 21 Drawing Figures

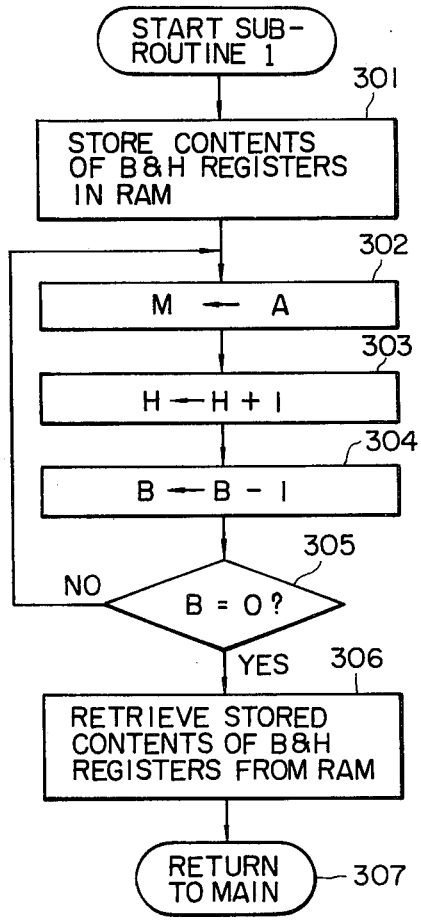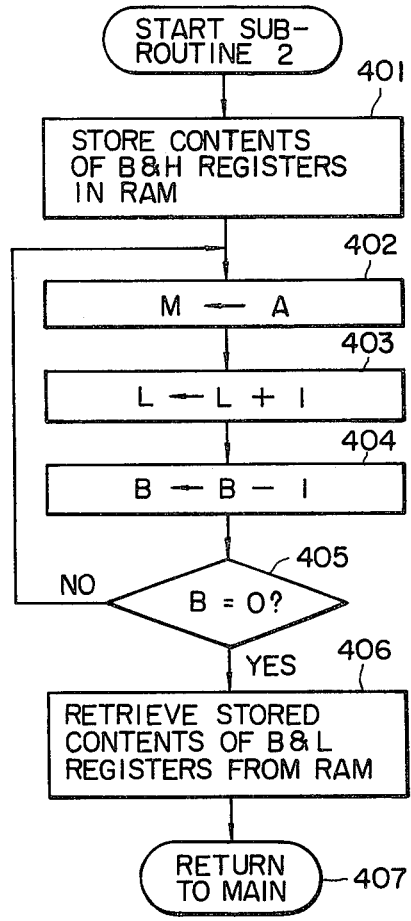

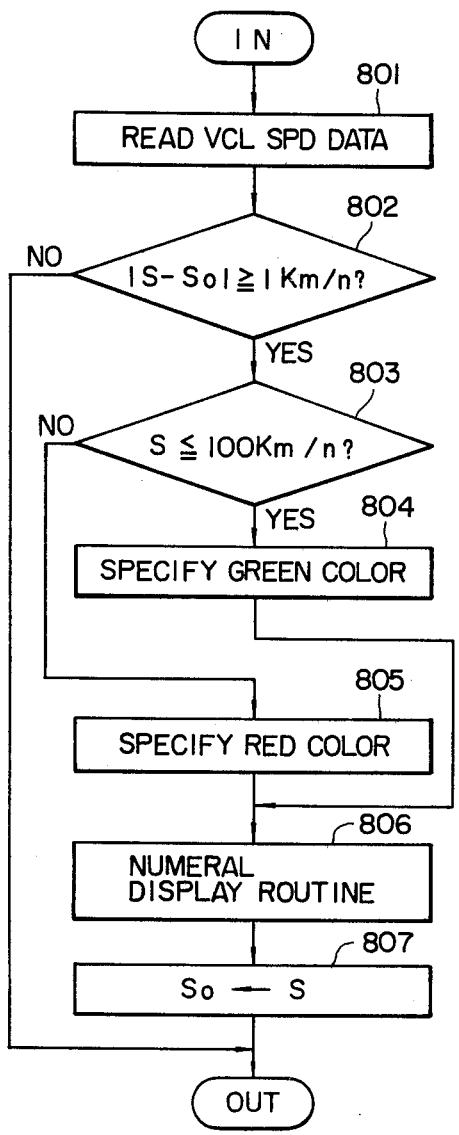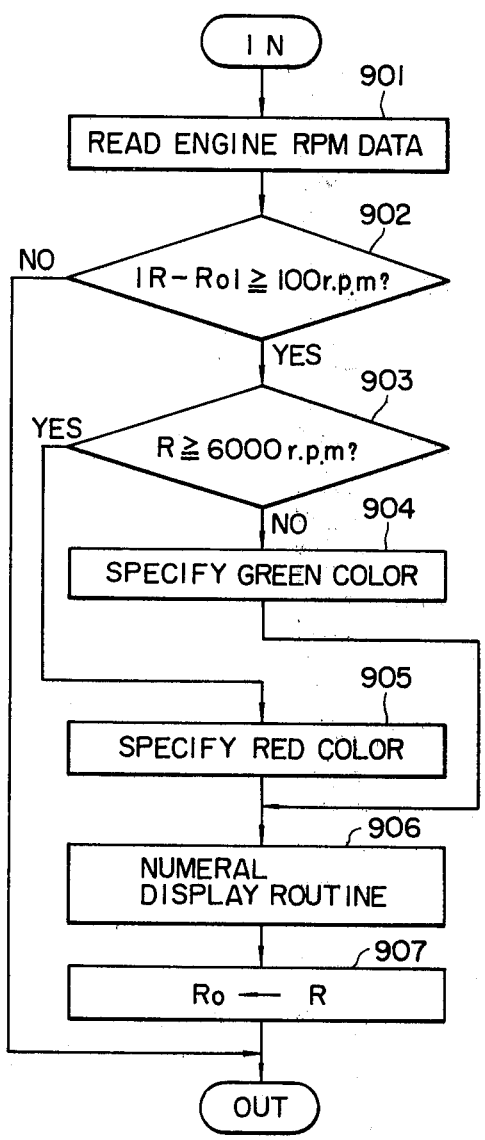

METHOD AND SYSTEM FOR DISPLAYING VEHICLE OPERATING PARAMETERS IN A VARIABLE FORMAT

BACKGROUND OF THE INVENTION

The present invention relates generally to display devices for automobiles and in particular to a method and a system for displaying various items of vehicle operating parameters and other useful information on a viewing screen in a variable format as a function of sensed vehicle operating parameters to give both normal and warning indications on the same screen.

Japanese Patent Application (Tokkaisho) 55-29712 discloses a vehicle-mounted display system having a viewingscreen on which a number of information items are displayed in a predetermined fixed format. Because of the inflexibility of the display format, the prior art system cannot be tailored to meet the specific needs and of the personal preference of vehicle occupants.

SUMMARY OF THE INVENTION

An object of the present invention is therefore to provide a method and a system for displaying a plurality of items of vehicle operating parameters in a variable format on a viewing screen as a function of sensed operating parameters.

In accordance with the invention, various vehicle operating parameters are monitored by respective sensors which generate signals indicative of the respective magnitudes of the sensed parameters. The monitored items of the operating parameters include, for example, engine coolant temperature, residual fuel quantity, interior and exterior temperatures. Signals from the sensors are fed to a control unit, which is preferably a microcomputer, where the input signals of important items are processed to detect when the monitored parameter is in an abnormal condition. All the sensor signals are converted by the control unit into corresponding display format data words indicative of the magnitudes of the monitored operating parameters. Format specifying data words are also generated in the control unit for respective monitored items to display the magnitudes of the monitored parameters on a video display unit in a format determined by the format specifying data words. The format specifying data word or words are modified in response to the detection of the abnormal condition so that the display format is enlarged to give a warning indication. A pushbutton is provided for each of the monitored items to allow a desired one of the displayed items to be enlarged on the display unit when the pushbutton is operated by the vehicle driver.

Therefore, the display system of the invention permits various desired items to be displayed on a common viewing screen while providing a clear indication of both basic and auxiliary information items as well as a clear indication of abnormal condition instantly when such condition should occur.

Warning indication items such as residual fuel quantity and coolant temperature may advantageously be given in the form of a vocal announcement by a vocal synthesizer connected to the control unit.

Because of the flexibility of the variable format display, the monitored items can advantageously be displayed in an appropriate format which meets the specific requirements of particular types of vehicle and the of personal preference individual users.

BRIEF DESCRIPTION OF THE DRAWINGS

These and other features and advantages of the present invention will be apparent from the following description when read in conjunction with the accompanying drawings, in which:

FIGS. 13 and 14 are flowcharts describing subroutines either or both of which can be employed for deriving useful data;

FIG. 18 is a flowchart describing the details of the vehicle speed display routine of FIG. 11;

FIG. 19 is a flowchart describing the details of the engine r.p.m. display routine of FIG. 11.

DETAILED DESCRIPTION

Figure 1:
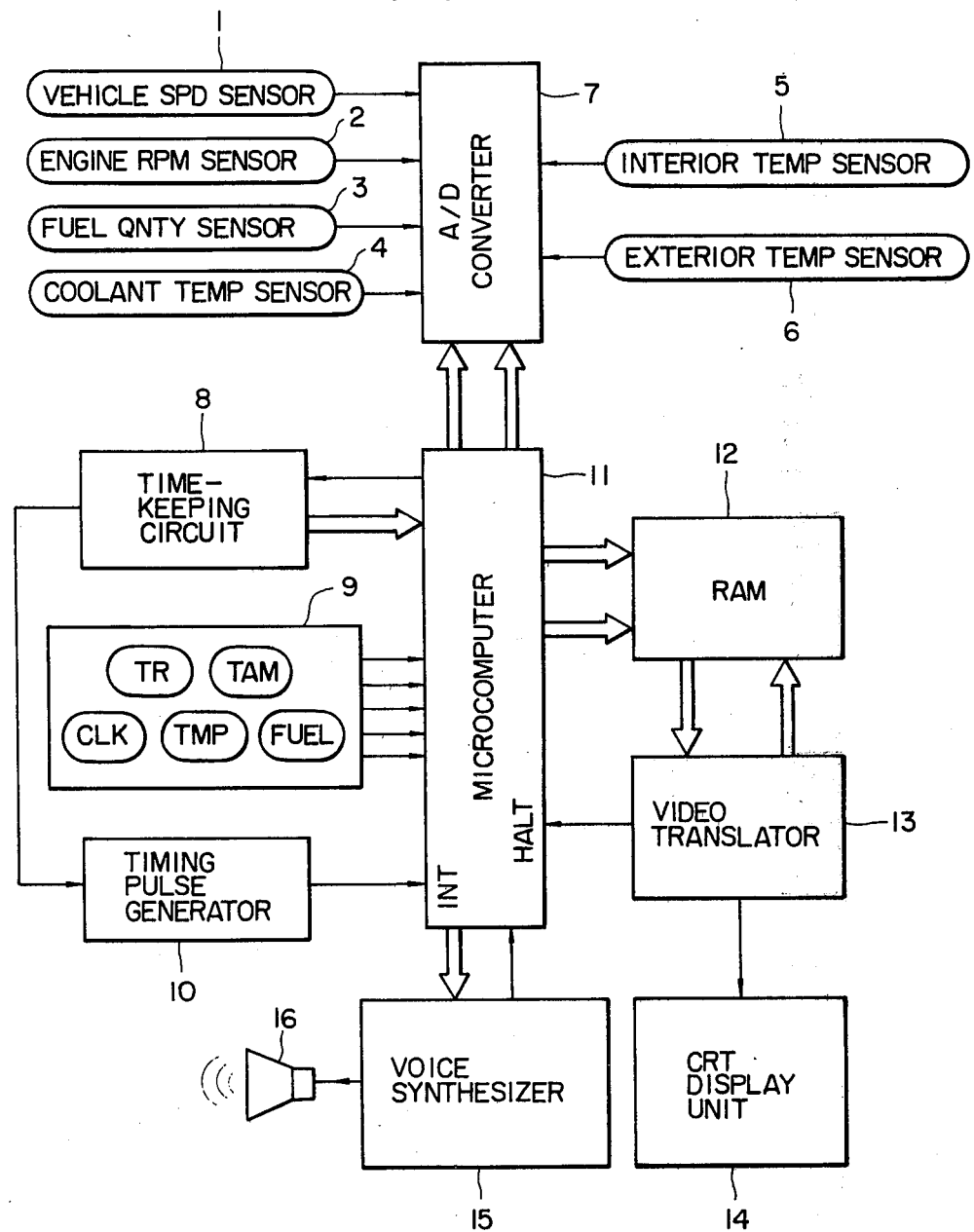
FIG. 1 is a schematic block diagram of the vehicle-mounted display system of the invention.

In FIG. 1 a vehicle-mounted display system of the invention is schematically illustrated in a functional block diagram using a microcomputer as a central control unit for processing digital data according to preprogrammed sequences.

Numeral 1 is a vehicle speed sensor including a magnetized toothed wheel which is driven by the vehicle axle to generate pulses to represent the speed of the vehicle by the number of such pulses generated within a unit period of time. The speed sensor 1 further includes a frequency-to-voltage converter for converting the generated pulses into an analog signal proportional to the vehicle speed value. An engine revolution sensor 2 is provided. This sensor is mounted within the ignition distributer of the vehicle to produce pulses in synchronism with engine crankshaft revolution. A fuel quantity sensor 3 is provided to detect the amount of fuel contained in the fuel tank by means of a potentiometer whose wiper tap is movably connected to a member which floats on the surface of the fuel. Engine coolant temperature is also detected by means of a thermistor type coolant temperature sensor 4. Further provided are interior and exterior temperature sensors 5 and 6 which detect the interior or room temperature of the vehicle and the exterior or ambient temperature of the vehicle, respectively, and which are respectively mounted on the upper-left corner of the instrument panel and on the rear side of the front grille. The analog signals generated by the sensors 1 through 6 are converted into respective digital signals by an analog-to-digital converter 7. A time-keeping circuit 8 includes a quartz oscillator and a plurality of frequency dividers for dividing the frequency of the oscillator to provide a record of time and provides a digital time signal to an output circuit in response to an externally applied command signal. On a panel 9 is mounted a plurality of non-lock type pushbuttons with a designation TR for entering a command signal to give interior temperature indication on a visual display unit, TAM for exterior temperature indication, CLK for time indication, TMP for coolant temperature indication, and FUEL for fuel quantity indication. Manual operation of any one of the pushbuttons will enable the associated indication to be displayed in an enlarged format. A timing pulse generator 10 receives signals from the quartz oscillator of the time-keeping circuit 8 to generate a time base clock pulse at 0.1-second intervals.

A microcomputer 11 is preprogrammed to process digital signals received from the analog-to-digital converter 7, time-keeping circuit 8, pushbutton panel 9 and from timing pulse generator 10 and processes the received digital signals according to a control algorithm to be described and generates digital outputs for visual display on a cathode ray tube display unit and as well as for audible indication.

A random access memory 12 is provided to receive display command data from the microcomputer 11 and store the received data therein. The command data includes address data words representing the location of picture elements of the cathode ray tube display screen and color identification data words which specify the color to be emitted from the addressed picture element. A translator circuit 13, which essentially comprises horizontal and vertical synchronizing pulse generators and a color signal converter. The sync pulse generators generate horizontal sync pulses at 63.5-microsecond intervals and vertical sync pulses at 16.6-millisecond intervals. The color signal converter reads the random access memory 12 in synchronism with the sync pulses to convert the color identification data words into a corresponding NTSC color signal and delivers the color signal with the vertical and horizontal sync pulses as a composite video signal to the cathode ray tube display unit 14. During the time when the color converter is in the process of signal conversion, a "halt" signal is applied to the microcomputer 11 from the translator circuit 13. The display unit 14 is of a conventional design which includes a video amplifier, vertical and horizontal deflection coils, flyback transformer and a cathode ray tube which displays data received from the translator 13 on a display screen having 128×192 picture elements. Numeral 15 represents a voice synthesizer having a read only memory which stores vocal data in specified storage locations. The stored vocal data are read out of the memory in response to an address data word which identifies the header address of a series of vocal data words, the read-out vocal data being fed to a loudspeaker 16 to generate a vocal warning announcement. When all the vocal data words have been read out of the memory, the voice synthesizer 15 detects the address of the last vocal data word and provides an "end-of-vocal-warning" signal to the microcomputer 11.

All the circuit blocks 1–16 except for the time-keeping circuit 8 are powered from a vehicle-mounted storage battery through an ignition key switch.

Figure 2:
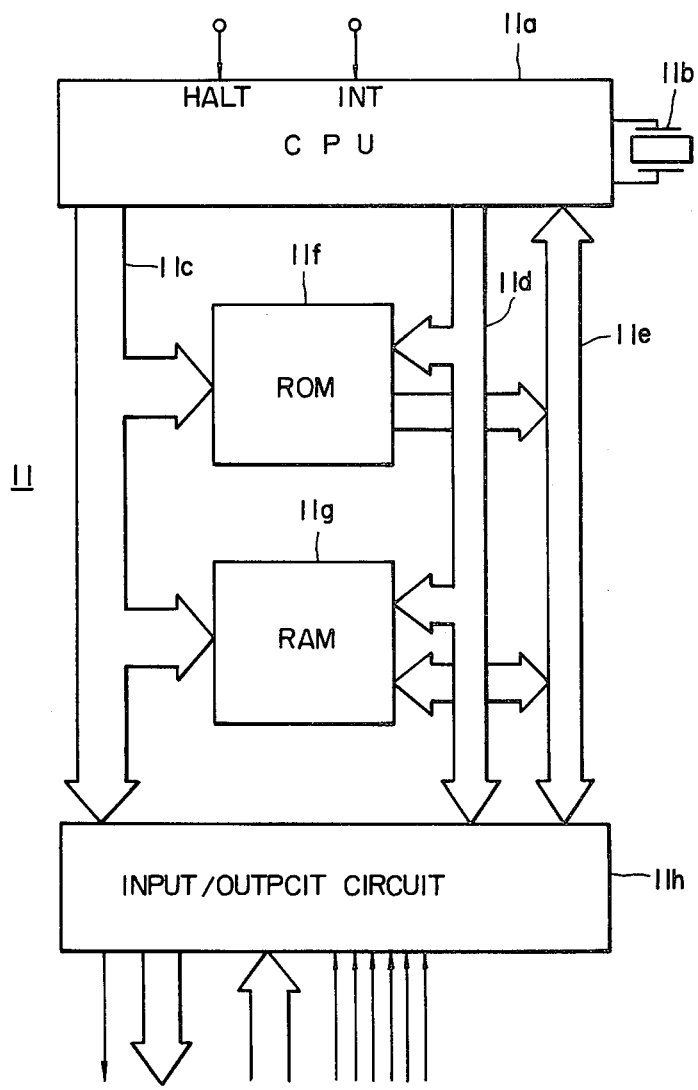
FIG. 2 is a detailed block diagram of the hardware of the microcomputer of FIG. 1.

FIG. 2 is an illustration of the detail of the hardware of the microcomputer 11. A central processing unit (CPU) 11a operates on several megaherz time base clock pulses supplied from a quartz oscillator 11b to execute various programmed instructions. The CPU and the clock source are mounted on a single semiconductor chip which is available as the type MC 6802 (Motorola). The central processor unit 11a is connected to a read only memory 11f, random access memory 11g and input/output circuit 11h via address bus 11c, control bus 11d and data bus 11e.

Figure 3:
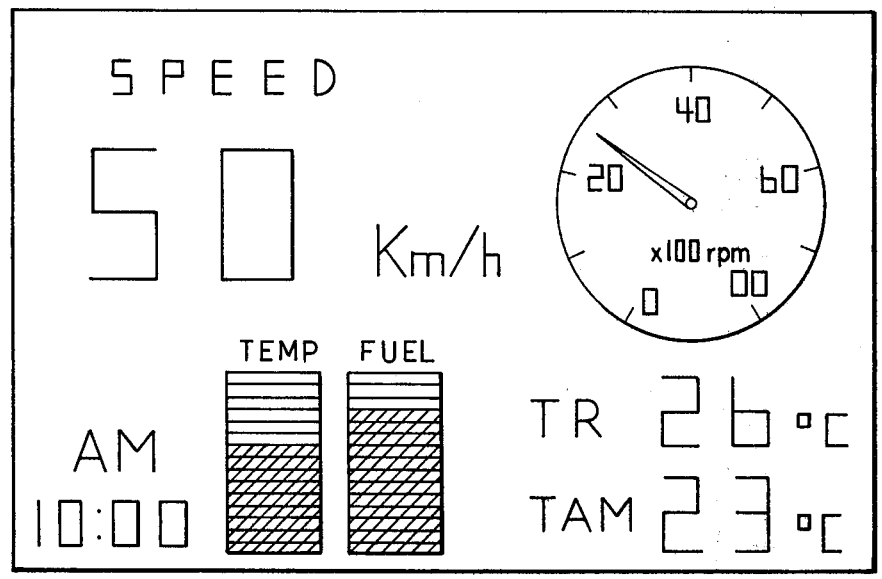
FIGS. 3 and 4 are sketches of display formats which are respectively selectable in response to a manual command signal when monitored items are in the normal conditions.
Figure 4:
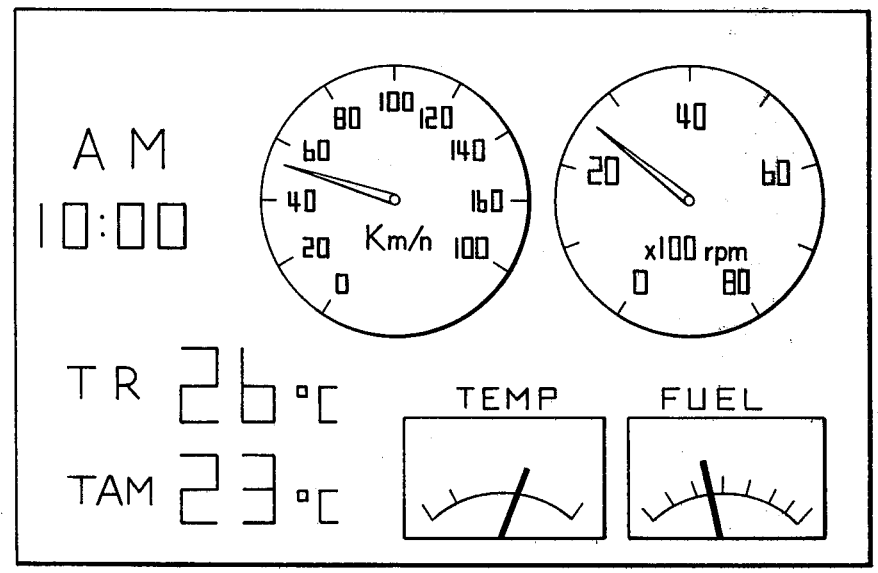
Figure 5:
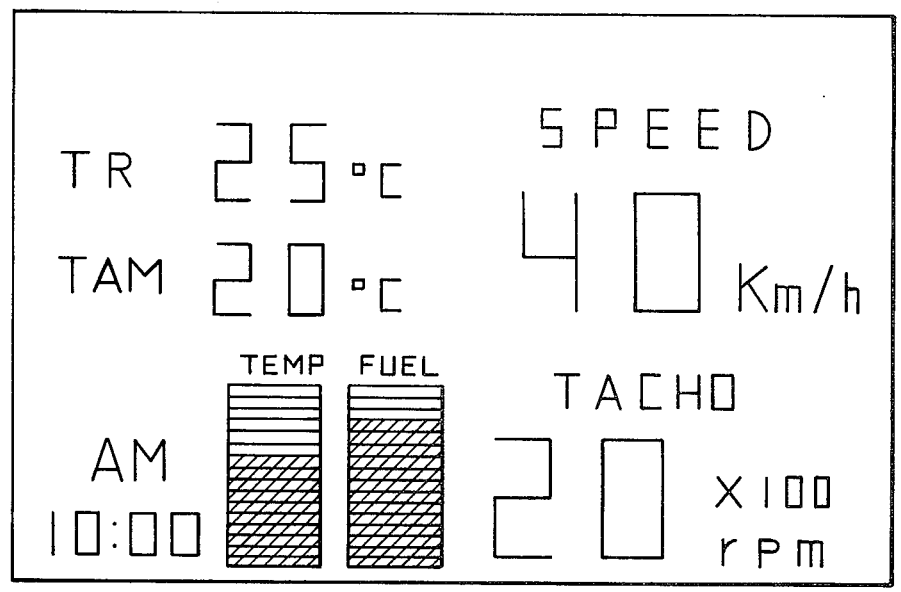
FIG. 5 is a sketch illustrating a display format for normal state indication.

The read only memory 11f stores preprogrammed instruction data describing the sequences of operational procedures required to give appropriate visual display and vocal warning announcement. The stored data is read out of the read only memory 11f into the central processor unit 11a and the data handled by the CPU 11a is temporarily stored in the random access memory 11g and read out of it as needs arises. The CPU 11a is connected to circuits outside of the microcomputer 11 through the input/output circuit 11h. The read only memory 11f is replaceable with another memory having different format specifying data so that a desired one of different visual indications can be put on display on the CRT display unit 14 as illustrated in FIGS. 3, 4 and 5.

A description of the microcomputer 11 of the invention will now be made with reference to FIGS. 5–10 and 11–19. For exemplary purposes, the read only memory 11f is loaded with the format specifying data which provides the FIG. 5 format.

Figure 11A:
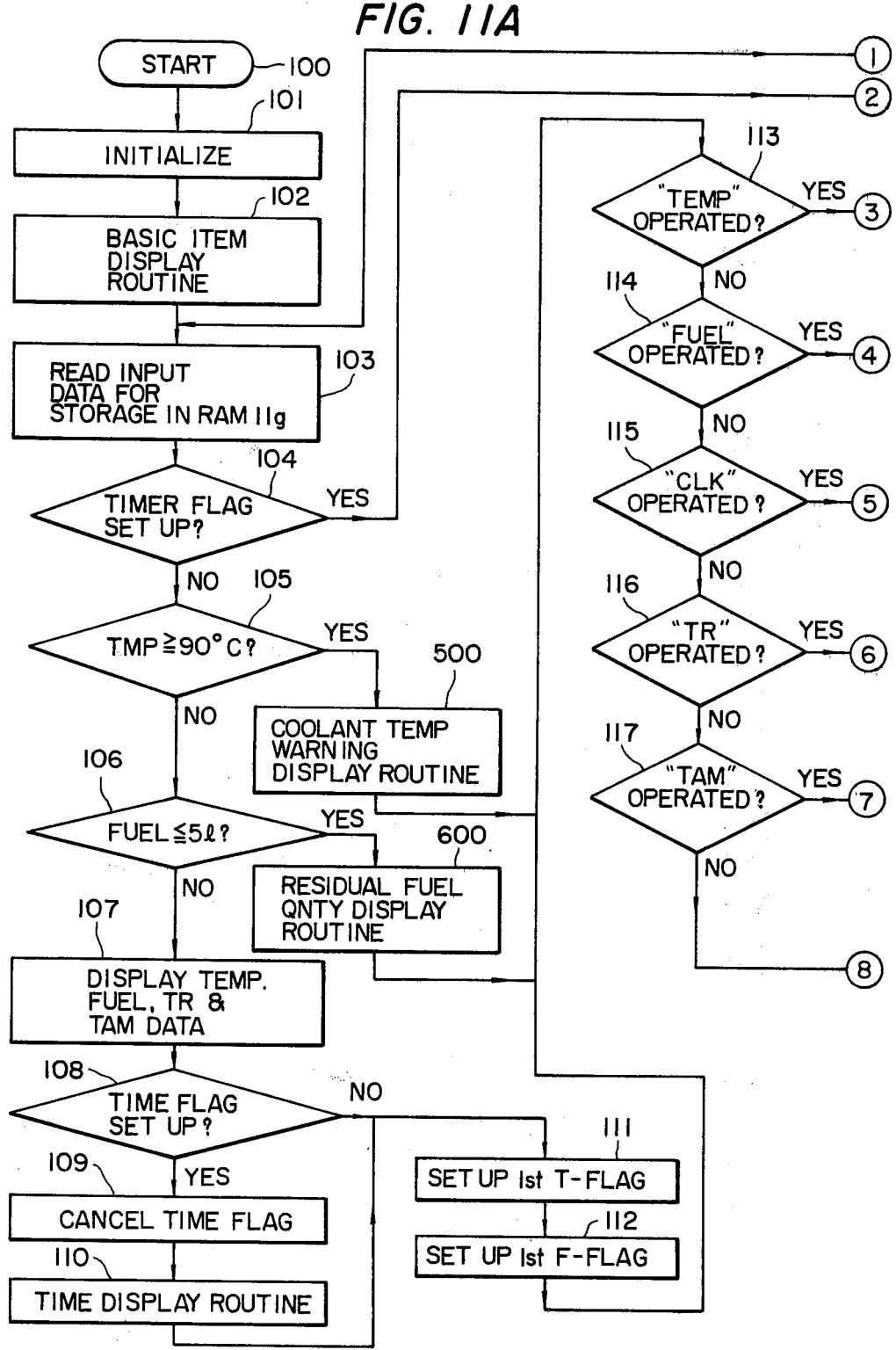
FIG. 11, shown in separate sheets A and B, is a flowchart describing the main routine of the program of the microcomputer of FIG. 1.
Figure 11B:
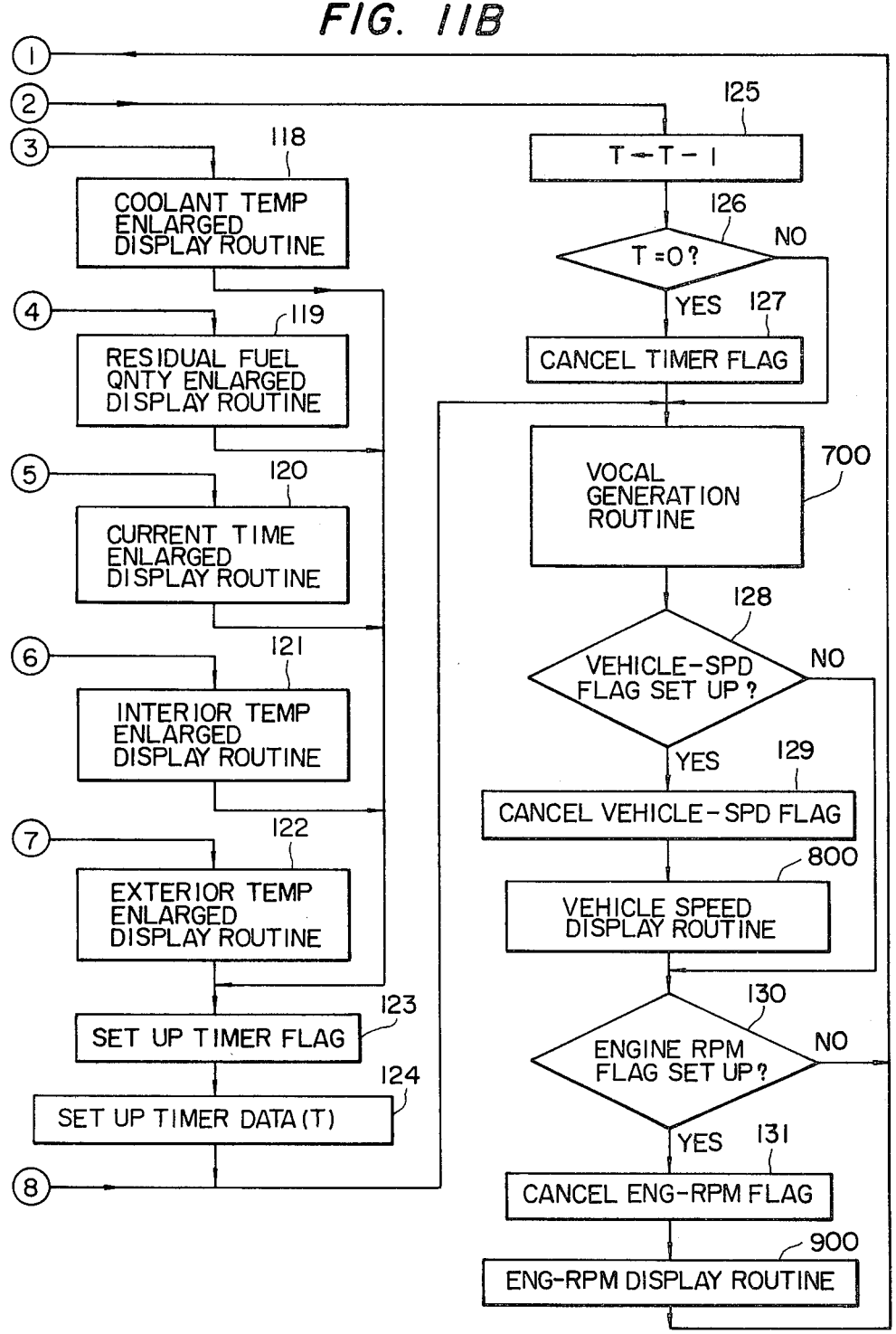

When ignition key switch is operated to supply power to various parts of the system of the invention, the microcomputer 11 starts execution of the program at step 100, FIG. 11, and proceeds to an initializing step 101 to initialize the registers, counters and latches of tne central processor unit 11a. In this initializing step, various flags including timer flag, T-vocal generation flag, F-vocal generation flag, vehicle speed flag, engine r.p.m. flag, hour flag, first T flag, and first F flag, which will be described later, are cancelled and execution number data X, Y and Z, and old vehicle speed data are all reset to "0".

The CPU goes to a basic data display routine 102 to generate data for displaying basic items of information in white color as indicated by "SPEED", "km/h", "TACHO" and "x 100" in FIGS. 5–10 and places the data into the read only memory 12. The basic item data are generated by one of two subroutines shown in FIGS. 13 and 14. Prior to the execution of either subroutine, "H" or "L" register is loaded with address data word that identifies the picture element which appears first in a series of picture elements contained in a differently colored portion of the display screen extending in vertical or horizontal direction ("H" and "L" registers being used for storing addresses for vertically and horizontally extending portions, respectively). The color information for the specified address location is represented in three bits (for eight color representations) and stored in "A" register, while a data word representing the length of the colored portion is stored in "B" register. Either of the subroutines is selected according to the specific needs or personal preference of the user. Assume that the subroutine of FIG. 13 is chosen, a step 301 is first executed whereby the contents of the "B" and "H" registers are placed temporarily into predetermined storage locations of the RAM 11g and subsequently at step 302 the contents of the "A" register are transferred to the storage locations of RAM 12 specified by the stored contents of the "H" and "L" registers. At step 303 "1" is added to the contents of the "H" register and at step 304 "1" is subtracted from the contents of the "B" register. The CPU goes to a step 305 to determine whether the contents of the "B" register are zero, and if a non-zero state is found it returns to step 302 to repeat the above steps to 305 until the "B" register contents become zero. A step 306 is then executed to retrieve the contents of the "B" and "H" registers now stored in the RAM 11g to allow the CPU to return at step 307 to the original routine. In the case of the subroutine of FIG. 14 similar processes to those of FIG. 13 are executed except that the "L" register is used instead of "H" register. More specifically, at step 401 the contents of the "B" and "L" registers are temporarily stored in predetermined locations of RAM 11g and at step 403 a "1" is added to the contents of the "L" register. At step 406 the contents of the "B" and "L" registers are retrieved from RAM 11g. In the remainder steps the same executions are performed as in steps 302, 304 and 305. Subroutines of FIGS. 13 and 14 may be used, singly or in combination, to generate data in the RAM 12 to provide a black background prior to generation therein of data for numerals and markings to be displayed against the background.

Returning to FIG. 11, the CPU proceeds to a step 103 to instruct the analog-to-digital converter 7 to convert the analog signals received from sensors 1 to 6 into corresponding digital signals. These digitally converted signals and the clock data from time-keeping circuit 8 are successively stored in specified locations of the RAM 11g. At step 104, the CPU checks to see if the timer flag has been set or reset. Since this timer flag was cancelled in the initializing step 101, "no" decision route is taken to a step 105 in which the engine coolant temperature data TMP is compared with a reference value of 90° C. to determine whether the sensed coolant temperature is equal to or higher than the reference temperature. If coolant temperature TMP is lower than the reference temperature as during vehicle starting periods, "no" route is taken to a step 106 to determine if the residual fuel quantity is equal to or smaller than a reference quantity of 5 litters. If sufficient amount of fuel is contained in the fuel tank, a "no" decision route is taken from step 106 to a "normal state" indication routine 107. In this indication routine 107, data words are generated in the RAM 12 based on the digital signals TEMP (coolant temperature), FUEL (fuel quantity), TR (interior temperature) and TAM (exterior temperature) from the analog-to-digital converter 7 using the subroutine of FIG. 13 or FIG. 14 or a combination thereof, so that items of "normal state" indication are displayed on the screen as shown in FIG. 5. For exemplary purposes it is specified in FIG. 5 that the hatched portions are lit red, the item indications "TEMP", "FUEL", "TR", "TAM" and "C" are in white, and other portions are lit green. The coolant temperature is indicated by a bar graph which is graduated with an increment of 7° C., and the fuel quantity indicator bar graph is graduated with a 4-litter increment.

Subsequent to the "normal state" indication routine 107, the CPU goes to a step 108 to check to see if hour flag has been set. If the hour flag, which was cancelled in the initilizing step 101, still remains in the cancelled state, a "no" decision route is taken to an execution step 111 in which a first T flag is set up and subsequently to an execution step 112 to set up a first F flag and thence to a decision making step 113. In the step 113, the CPU checks to see if the TEMP pushbutton on panel 9 has been operated for the purpose of displaying coolant temperature indication in an expanded format. If the TEMP pushbutton has not been operated, a step 114 is executed to check for the operation of FUEL pushbutton on panel 9 for the purpose of displaying residual fuel quantity indication in an expanded format. If "no" decision is made in the fuel check step 114, step 115 is executed to check to see if the CLK pushbutton on panel 9 has been operated for displaying the current hour in an expanded format. A "no" decision in the CLK check step 115 will cause it to be followed by a TR check step 116 in which the CPU checks for the operation of TR pushbutton on panel 9 for the purpose of putting the interior temperature on display in an expanded format. "No" decision is made in the TR check step 116 causes the latter step to be followed by a TAM check step 117 in which the TAM pushbutton on panel 9 is checked if it has been operated for displaying exterior temperature indication in an expanded format. A "no" decision is made in the TAM check step 117 to cause it to be followed by a vocal generation routine 700.

Figure 17:
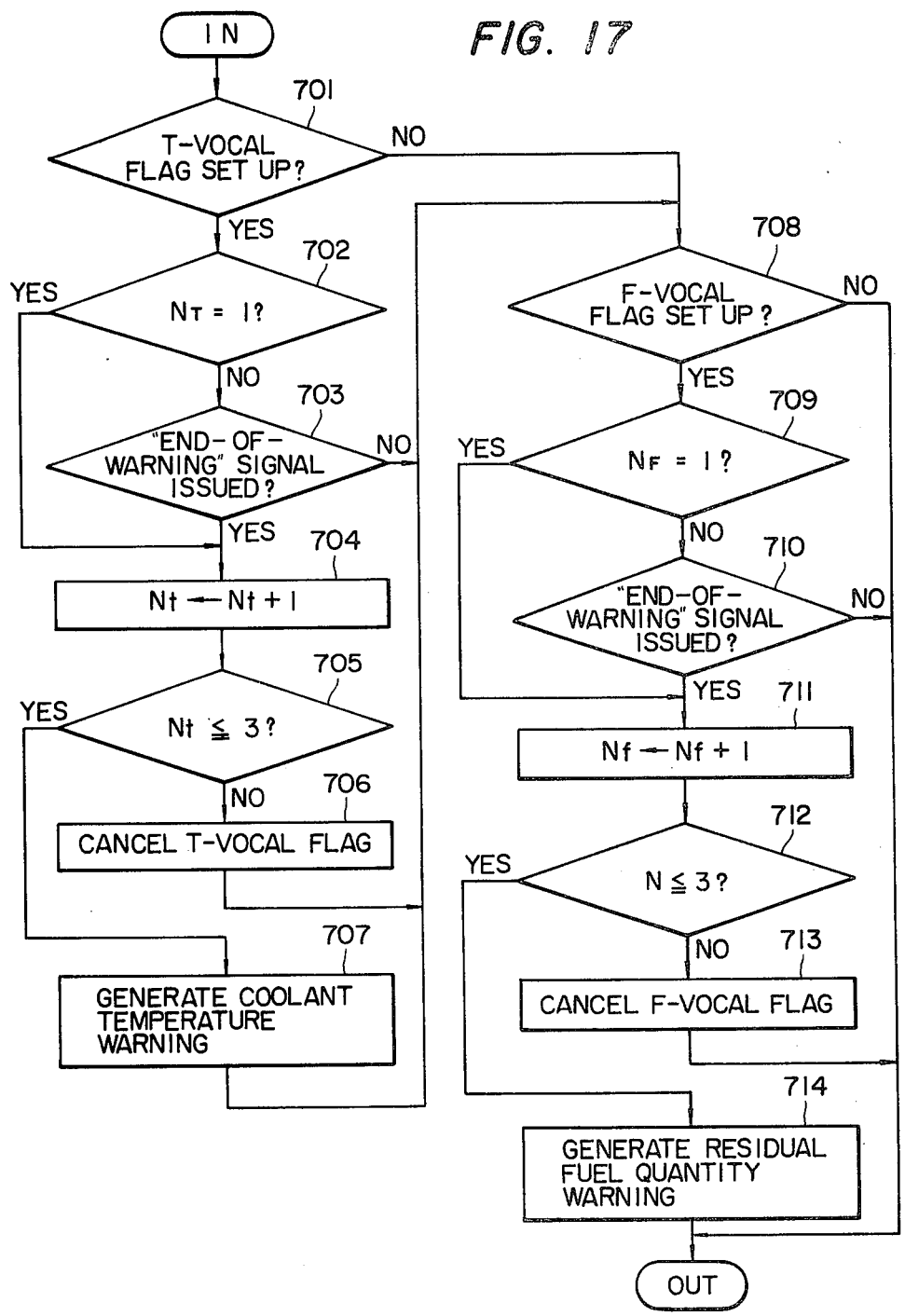
FIG. 17 is a flowchart describing the details of the vocal generation routine of FIG. 11.

The vocal generation routine 700, shown in FIG. 17, begins with a step 701 in which the CPU checks to see if the T vocal flag has been set or reset. Since this T vocal flag was cancelled in the initializing step 101, "no" decision is made at step 701 to go to a step 708 to check to see if the F vocal flag has been set or reset. Since this F vocal flag was cancelled in the initializing step 101, "no" decision is made to terminate the first execution cycle of the vocal generation routine 700. The CPU then goes to a vehicle-speed flag check step 128, FIG. 11, to check to see if the vehicle speed flag has been set and makes "no" decision since it was cancelled in the initializing step 101 and advances to a engine r.p.m. flag check step 130. In the step 130, the CPU checks to see if the engine r.p.m. flag has been set up, and if this flag remains in the set-up condition, the CPU takes a "no" decision route and returns to the data entry step 103. Steps 103 to 130 of the main routine are repeatedly executed thereafter at intervals of several hundreds milliseconds.

Figure 12:
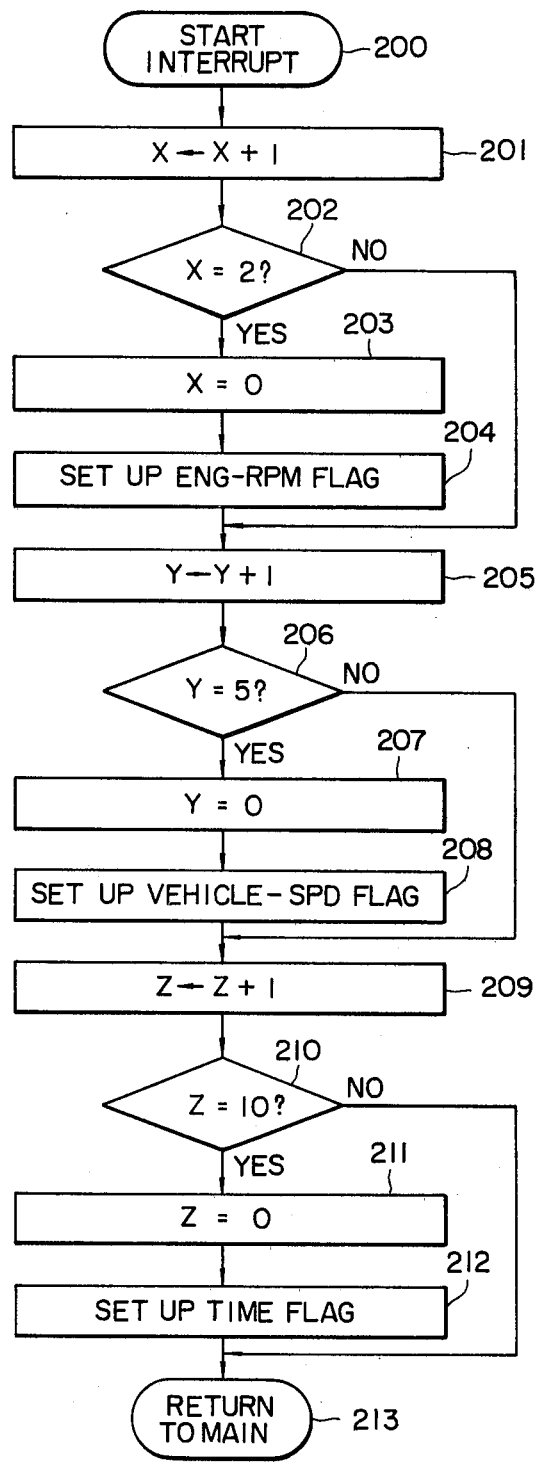
FIG. 12 is a flowchart describing an interrupt routine of the program.
Figure 15:
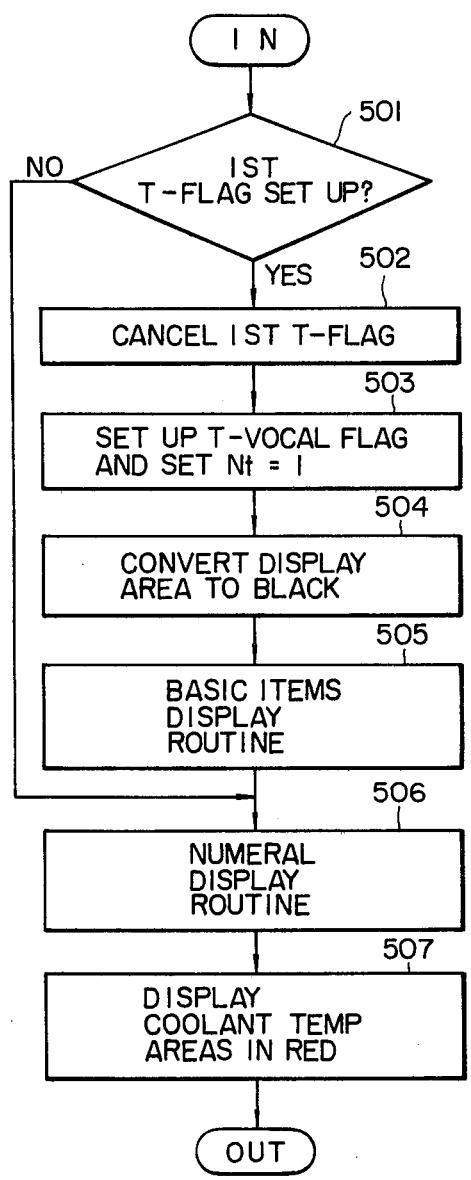
FIG. 15 is a flowchart describing the details of the coolant temperature warning routine of FIG. 11.

During the time when the main routine is repeatedly executed, a 0.1-second timing pulse from the timing circuit 10 causes the CPU to interrupt the main routine to execute the interrupt program of FIG. 12 which begins with an interrupt start step 200. At step 201 a "1" is added to execution number data X, which is followed by a check step 202 wherein X is checked if it is equal to 2 and if so the CPU goes to an execution step 203 to reset X to zero. Engine r.p.m. flag is then set up at step 204. A step 205 is executed either in response to the "no" decision from step 202 or in response to the end of step 204 to add "1" to execution number data Y. The updated Y data is checked to see if the execution number Y reaches "5". Data Y is reset to zero at step 207 if the execution number "5" has been reached and vehicle speed flag is then set up at step 208. "Add-1-to-Z" step 209 is executed either in response to the "no" decision taken from step 206 or in response to the end of step 208 in order to add "1" to the execution number data Z. The CPU then proceeds to a step 210 to check for data Z to see if it corresponds with a reference number "10". If the correspondence exists, data Z is reset to zero at step 211 and if not, a return step 213 is executed to terminate the interrupt routine. Following the step 211, hour flag is set up at 212 and the return step 213 is then executed to allow the CPU to return to the main routine. Since this interrupt routine is executed at 0.1-second intervals, the engine revolution flag, vehicle speed flag and hour flag are repeatedly set up at intervals of 0.2-second, 0.5-second and 1.0-second, respectively.

During the subsequent main routine execution, "yes" decision is made at step 130 to allow the CPU to go to a step 131 to cancel the engine revolution flag and proceed to an engine revolution display routine 900. This routine begins with a data read step 901 in which the engine r.p.m. data R is read out of RAM 11g into which this data was placed at step 103 and old engine r.p.m. data Ro is also retrieved. At step 902 the CPU detects the difference in value between R and Ro and checks for the difference value to see if it is equal to or greater than a reference value of 100 r.p.m. If the difference value is smaller than the reference, it is not necessary to display engine r.p.m. value, so that this display routine is terminated, and if not, a step 903 is executed to determine if the r.p.m. R is equal to or greater than 6000 r.p.m. If R is lower than 6000 r.p.m., a step 904 is executed to store a data word in a color specifying address location of RAM 11g indicating that r.p.m. data be displayed in green color. Conversely, if R is equal to or higher than 6000 r.p.m., a step 905 is executed to store a red color display data word in RAM 11g. A numerical data display routine 906 is executed either in response to the end of step 904 or 905. In the r.p.m. numerical data display routine 906 the CPU selects the r.p.m. map in RAM 11f where data R is stored and derives a display format data word from the map data and the data stored in the color specifying address location of RAM 11g and from the data which specifies black areas, and stores the derived display format data in RAM 12 for the purpose of displaying the numerical value of R on CRT display unit 14 in green or red color against the black background. FIG. 5 indicates an engine r.p.m. value of 2000 r.p.m. in green color marked TACHO. The CPU then proceeds to a memory step 907 to store the current r.p.m. data R as old r.p.m. data Ro and terminates an operation of the engine r.p.m. display routine 900. Therefore, it is appreciated that when the current engine r.p.m. value deviates from the old r.p.m. value by at least 100 r.p.m., the old data is renewed and that when the current r.p.m. value is lower than 6000 r.p.m, the data is indicated in green and when it exceeds that value the indication is given in red as a warning signal.

"Yes" decision will be made at step 128 in the next main routine execution to cancel the vehicle speed flag at step 129 to execute a vehicle speed display routine 800 which begins with a step 801, FIG. 18, to read old vehicle speed data So and current vehicle speed data S which was retrieved at step 103. A step 802 is executed to detect a speed difference between S and So and check for the speed difference to see if it is equal to or greater than a reference speed 1 km/h. If the speed difference is smaller than the reference value, vehicle speed indication is not to be displayed and "no" decision is made in the step 802 to return to the main routine. If the speed difference is equal to or higher than the reference value, "yes" decision is made at step 802 to proceed to a step 803 in which the current speed S is checked to see if it is equal to or lower than a reference speed 100 km/h. If the current speed S is equal to or smaller than 100 km/h a step 804 is executed to store a green color instruction data word in the specified storage location of RAM 11g, and if not, a step 805 is executed to store therein a red color instruction data word. A numeral display routine 806 is executed either in response to a "no" decision taken from the step 803 or in response to the end of the step 804 to select the map from RAM 11g where data S is stored. From the selected map data and the contents of the color instruction storage location of RAM 11g and from black specifying data, a numerical data word is derived and stored in RAM 12 in order for the display unit 14 to give a current vehicle speed indication in red or green against the black background. For exemplary purposes a vehicle speed value of 40 km/h is displayed in green as shown in FIG. 5. The old vehicle speed data So is updated with the current value at step 807, terminating an execution of the vehicle speed display routine 800. Therefore, the old vehicle speed data is renewed only when the vehicle speed deviates from the previous value by at least 1 km/h and in that event green color indication is given when the current speed is lower than 100 km/h and a speed-over warning indication is given in red if that speed exceeds 100 km/h.

Since hour flag is set up in the interrupt routine (see FIG. 12), "yes" decision will be made at step 108 in the main routine when the CPU resumes after the execution of the vehicle speed display routine 800. The CPU proceeds to a step 109 to cancel the hour flag and advances to an hour display routine 110. In this hour display routine, the CPU reads the hour data CLK which was stored in memory at step 103 to select the maps from ROM 11g where numerical hour data and markings "AM" and "PM" are stored. From the data stored in the selected maps and from green color specifying data and black background data stored in RAM 11g, a data word for current time is derived and stored in RAM 12 in order for the display unit 14 to indicate the current time in green against the black background. FIG. 5 illustrates a format for the current time indication in which 10:00 AM is indicated as an example.

The main and interrupt routines (FIGS. 11 and 12) are repeatedly executed in a manner just described to renew the vehicle speed data S, engine r.p.m. data R and current time data CLK.

Figure 7:
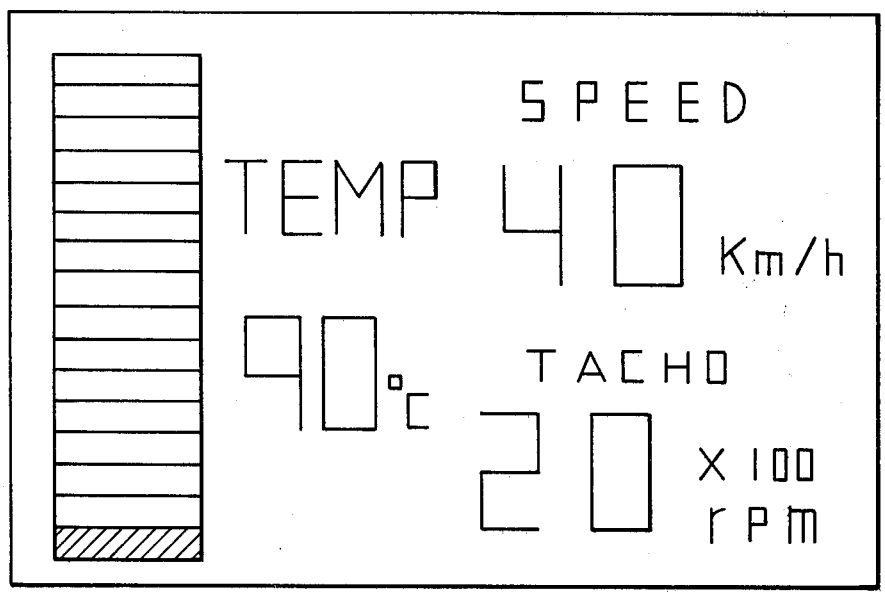

Assume that the engine coolant temperature has increased so that the coolant temperature data TMP shows that it has reached 90° C., "yes" decision will be taken from step 105 to a coolant temperature warning routine 500 which begins with a step 501, FIG. 5, where th first T flag is checked to see if it has been set up. Since this flag was set up at step 111, an "yes" decision route is taken to a step 502 to cancel the first T flag and a step 503 is executed to set up T-vocal flag and set the execution number data Nt to "1". A black conversion routine 504 is then executed to store an instruction data word in RAM 12 to black out the areas in which various data are displayed including coolant temperature data, fuel data, interior and exterior temperature data and current time data. The CPU then advances to a fixed-item display routine 505 in which it generates a data word that signifies that the fixed items of data which are displayed in a format as shown in FIG. 7 be surrounded respectively by white-colored frames. These items include the markings TEMP, °C. and the bar graph. The generated data word is stored in RAM 12 and a numeral display routine 506 is subsequently executed. In the numeral display routine 506, the CPU selects the map from ROM 11f where the coolant temperature data TEMP is stored and derives a coolant numeral data word from the selected map data and from the red-color specifying data and the black background data which are stored in RAM 11g and stores the derived data word in RAM 12 for the purpose of dislaying the coolant temperature in red against black background. If the coolant temperature is 90 degrees the lowermost graduation will be shone red as illustrated in FIG. 7. For this purpose, a red indication routine 507 is executed to select a graduated area or areas according to the amount of deviation from the 90° C. reference from sixteen graduated areas lying between 90° C. and 121° C. The CPU utilizes the subroutines of FIGS. 13 or 14 or a combination thereof to derive a display data word which signifies that all the selected temperature areas be lit in red color and stores this data word in RAM 12 with which the display unit 14 the coolant temperature data, terminating the coolant temperature warning display routine 500.

The CPU now returns to the main routine and executes steps 113 to 117 and thence to a vocal generation routine 700, shown in FIG. 17, which begins with a step 701 to check for the T-vocal flag if it has already been set up. Since the T-vocal flag was set up in step 503, FIG. 15, an "yes" decision route is taken to a step 702 to check to see if the execution number data Nt is equal to "1". Being true, the step 702 is followed by a step 704 to add "1" to Nt to renew its contents to Nt=1+1=2. A step 705 then follows to check for the execution number Nt to see if it is equal to or smaller than "3". Since Nt is 2, an "yes" decision route is taken to a coolant temperature vocal warning routine 707. In this vocal warning routine 707, the CPU reads the header address data of coolant warning vocal information data from ROM 11f and transfers the read-out data to the voice synthesizer 15. Subsequently, a step 708 is executed to check for the F-vocal flag to see if it has alreadly been set up and since this F-vocal flag has not been set up a "no" decision route is made to terminate an execution of the vocal generation routine 700, which cause the loudspeaker 16 to give a vocal warning which sounds "coolant temperature is abnormally high".

After executing various steps, the CPU will come to the step 105 again and makes an "yes" decision to go to the coolant temperature warning routine 500 again. Since the first T flag has been cancelled, a "no" decision route is taken from step 501 to numeral indication routine 506 and thence to red-color indication step 507, terminating an execution of the routine 500. Thereafter, the coolant temperature warning routine 500 is executed in a manner just described each time the CPU comes to this routine to renew the TMP indication (FIG. 7).

Referring again to FIG. 17, when the CPU comes to the step 701 again it makes an "yes" decision since the T-vocal flag has been set up and proceeds to step 702 and makes a "no" decision since Nt has been set equal to "2". A step 703 is executed to check to see if an "end-of-vocal-warning" signal has been issued from the vocal synthesizer 15. The CPU makes a "no" decision if the "end-of-vocal-warning" signal has not yet been issued and goes to a step 708 to check to see if F-vocal flag has been set up for the purpose of fuel quantity indication. Since the F-vocal flag has not yet been set up the CPU returns to the main routine, so that each time the CPU comes to the vocal generation routine 700 the process just described is repeated until the "end-of-vocal-warning" signal is issued from the vocal synthesizer 15, whereupon the CPU makes an "yes" decision at step 703 and advances to step 704 to add "1" to Nt so that Nt is set to Nt=2+1=3. "Yes" decision is made at execution number check step 705, which is then followed by coolant temperature vocal warning routine 707 in which the CPU generates an address data for vocal information in the ROM of vocal synthesizer 15 and then proceeds to F-vocal flag check step 708. Vocal warning "coolant temperature is abnormally high" is again generated by the loudspeaker 16.

When the CPU arrives at the vocal generation routine 700 again next time, there is no "end-of-vocal-warning" signal, and the CPU makes "no" decision at step 703 and returns to the main routine through F-vocal flag check step 708. The above process is repeated until the vocal synthesizer 15 generates an "end-of-vocal-warning" signal, whereupon "yes" decision is made at step 703 to advance to step 704 to add "1" to Nt so that Nt is set equal to 4 1=3+1). "No" decision is made at step 705 to advance to a step 706 in order to cancel the T-vocal flag. The CPU returns to the main routine through the F-vocal flag check step 708. Therefore, when the CPU executes the vocal generation routine next time, it will make "no" decision at the T-vocal flag check step 701 and returns to the main routine through F-vocal flag check step 708, thereby terminating a full cycle of the vocal generation routine 700.

Figure 6:
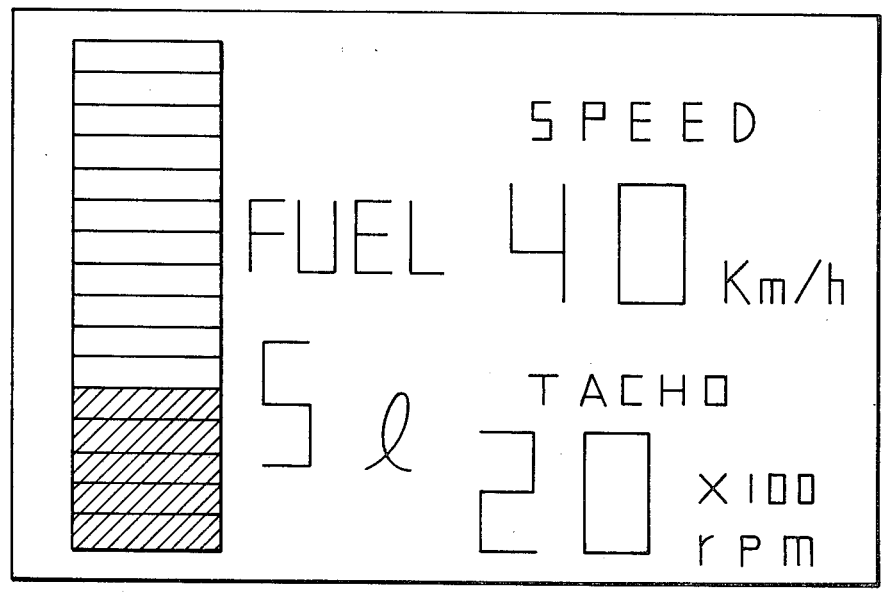
FIGS. 6 and 7 are sketches illustrating abnormal conditions of important items being displayed in an enlarged format together with basic information items.
Figure 16:
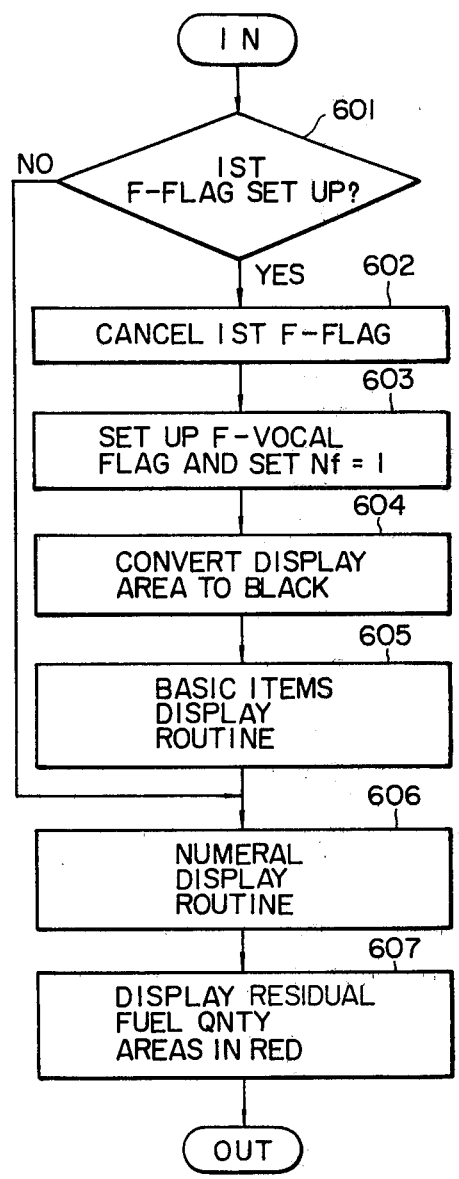
FIG. 16 is a flowchart describing the details of the residual fuel quantity warning routine of FIG. 11.

Assume that residual fuel quantity reaches 5 litters provided that coolant temperature is lower than the 90 Ccritical point, "yes" decision is made at step 106 in a subsequent main routine operation to allow the CPU to advance to a fuel quantity warning routine 600 which begins at step 601, FIG. 16. In the step 601, first F flag is checked to see if it has already been set up and, since this first F flag has been set up at step 112, an "yes" decision route is taken to a step 602 to cancel the first F flag. In the following step 603, the F-vocal flag is set up and execution number data Nf is set equal to "1". In a manner identical to step 504, a black-out data word is stored in RAM 12 at step 604 to provide a black background in areas in which fuel quantity data are to be displayed. A fixed item display routine 605 is then executed to generate a display pattern data and stores it in RAM 12 in order to create a white-colored frame on the display unit 14 around each of the items including FUEL, "1" and the bar graph, as shown in FIG. 6. The CPU then goes to a numeral display routine 606 to select the map within ROM 11f where the corresponding fuel quantity data is stored and derives a fuel quantity numerical data word from the selected map data and from the red-color specifying data and black-color specifying data which are read out of RAM 11g and stores the derived numerical data word in RAM 12 for displaying the numerical value of residual fuel quantity in red color against the black background. For exemplary purposes FIG. 6 gives an indication of residual fuel quantity being 5 litters in numeral and bar-graph representations. The CPU then advances to an area indication step 607 to select the areas from zero- to 16-litter graduations which represent the residual quantity of fuel and derives a display pattern data word for indicating the selected areas in red using the subroutines of FIGS. 13 or 14 or a combination thereof and stores the derived display pattern data word in RAM 12.

An execution of the fuel quantity warning routine 600 is terminated and the main routine is resumed. The CPU advances to the vocal generation routine 700 via steps 113 through 117. In FIG. 17, via the step 701 the CPU goes to the F-vocal flag check step 708 and makes an "yes" decision to advance to a step 709 to check to see if execution number Nf is equal to "1". Since this condition is met in the step 709, a step 711 follows it to add "1" to Nf so - that the latter is set equal to 2 (=1+1). The CPU advances to a check step 712 to check for the execution number Nf to see if it is equal to or smaller than "3" and since this condition is met, the CPU goes to a fuel quantity vocal warning routine 714. In this routine the CPU generates an address specifying word that identifies the header address of the residual fuel quantity data areas of the ROM of vocal synthesizer 15 to cause it to generate a warning announcement "fuel is running short" through the loudspeaker 16, and terminates an execution of the vocal generation routine 700.

After executing a number of steps, the CPU now returns to the fuel quantity check step 106 of the main routine where it makes an "yes" decision and proceeds to the residual fuel quantity warning routine 600 again. Since the first F flag has been cancelled, "no" decision is made at step 601 in the routine 600 to execute the display routines 606 and 607 in succession and a main routine execution follows. As long as the residual fuel quantity falls short of the critical level the fuel quantity warning routine 600 is repeatedly executed in a manner just described to renew the residual fuel quantity.

In the vocal generation routine 700, on the other hand, the steps 701, 708 through 710 are recyclically executed until an "end-of-vocal-warning" signal is issued from the vocal synthesizer 15, whereupon the CPU goes to step 711 to add "1" to Nf so that the latter is set equal to 3 (=2+1) and step 712 is subsequently executed. Since Nf is equal to "3", the fuel warning vocal generation routine 714 is executed to repeat the vocal warning.

In the subsequent execution of the routine 700, the steps 701, 708 through 711 are executed again to add "1" to Nf so that it is set equal to 4 (=3+1), whereby a "no" decision is made at step 712 to execute a step 713 to cancel the F-vocal flag. Afterward, the CPU passes through the steps 701 and 708 and back to the main routine.

Figure 8:
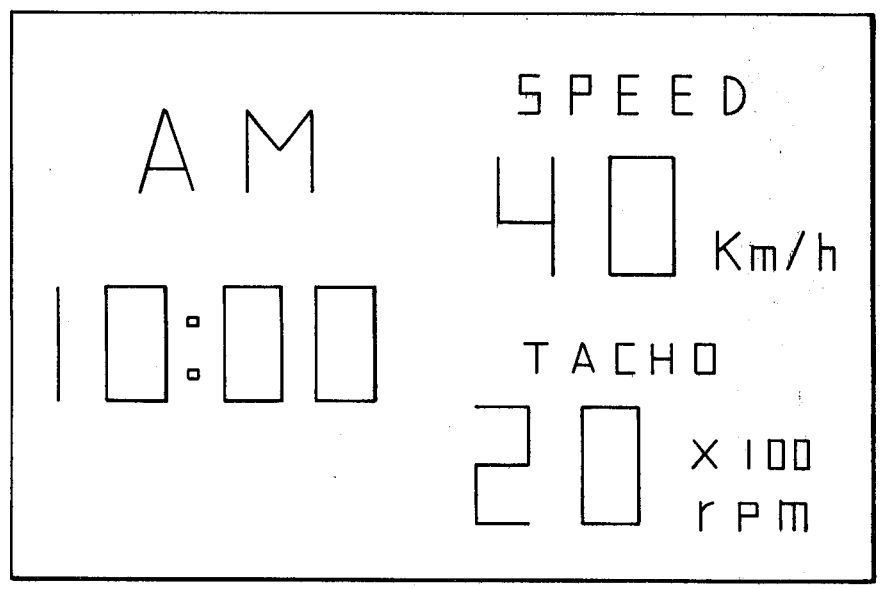
FIGS. 8, 9 and 10 are sketches illustrating the useful information items being displayed in an enlarged format together with the basic information items.

When the CLK pushbutton is operated for displaying the current time in an enlarged format, an "yes" decision is made at step 115 during execution of the main routine, FIG. 11, to allow the CPU to advance to a time display routine 120. In the routine 120 the CPU generates a color display word for indicating the current time data in green color as shown in FIG. 8 using the subroutines of FIG. 13 or 14 in a manner described above and stores the color display word in RAM 12 and goes to a step 123 to set up a timer flag and thence to a step 124 to set up a timer data T so as to cause the CPU to repeatedly execute the main routine for an interval of about 5 seconds.

Subsequent to the execution of the vocal generation routine 700 and passing through various steps, the CPU arrives at the timer flag check step 104 and takes an "yes" decision route to a step 125 to subtract "1" from the timer data T and proceeds to a step 126 to check for data T to see if it is equal to zero and takes a "no" decision route to the vocal generation routine 700 since data T has just been set up. The CPU repeats the above executions for an interval of about 5 seconds, so that the timer data becomes zero and an "yes" decision route is taken from step 126 to a step 127 to cancel the timer flag and thence to the vocal generation routine 700. After execution of the vocal generation routine 700 and a number of steps subsequent thereto, the CPU arrives at the timer flag check step 104 again and takes a "no" decision route to the coolant temperature check step 105. Therefore, the CPU thereafter displays the "normal state" indication (FIG. 5), fuel quantity indication (FIG. 6) and coolant temperature indication (FIG. 7). The current time indication is thus displayed in response to the operation of the CLK pushbutton for an interval of about 5 seconds by interrupting other data which is being displayed. The interrupted data is displayed again after the end of the current time display.

Figure 9:
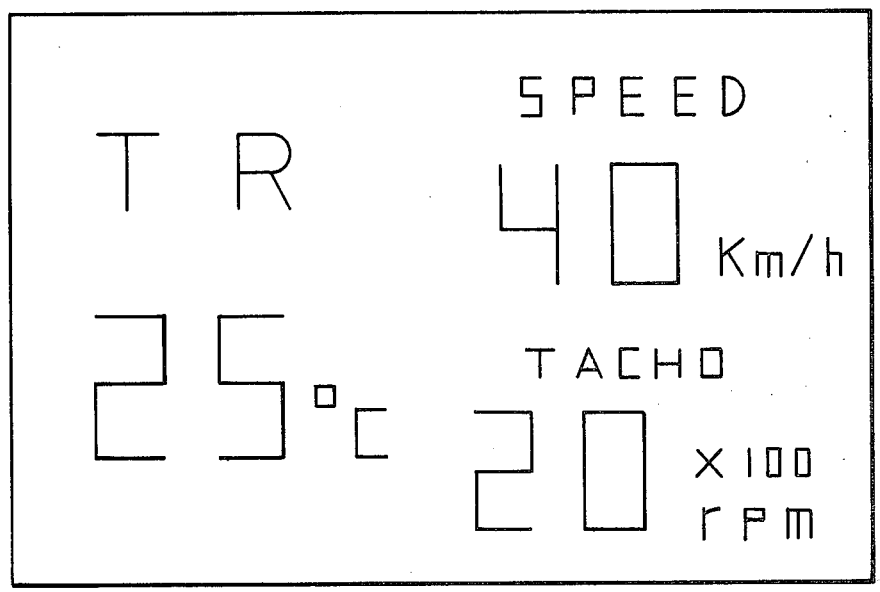
Figure 10:
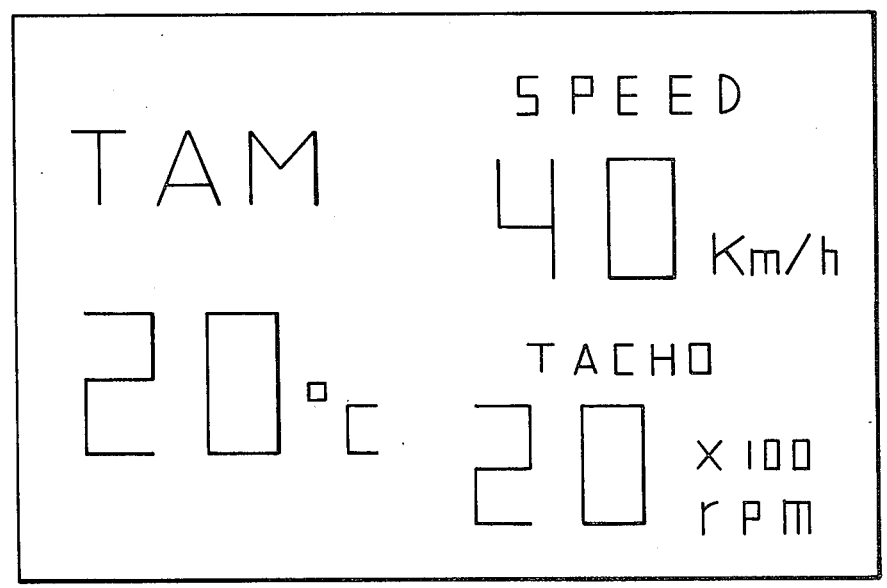

When TR pushbutton is operated on panel 9 for displaying the interior temperature data TR, an "yes" decision is taken from step 116 to an interior temperature dislay routine 121 to execute a process similar to that of the current time display for displaying the interior temperature for an interval of about 5 seconds in green color in an enlarged format shown in FIG. 9.

Operation of TAM pushbutton will then cause the step 117 of the main routine to issue an "yes" decision to execute an exterior temperature display routine 122, whereby green-colored exterior temperature is displayed in an enlarged format as shown in FIG. 19 for an interval of about 5 seconds.

Operation of TEMP pushbutton will then cause the step 113 to issue an "yes" decision to execute a coolant temperature display routine 118 to display that temperature in a enlarged format for an interval of about 5 seconds as shown in FIG. 7 (in which the bar-graph representation is an enlarged version of the corresponding bar-graph of FIG. 5 and in which the graduated areas are lit in red color against green-colored background).

Operation of FUEL pushbutton will likewise cause the step 114 to issue an "yes" decision to execute a residual fuel quantity display routine 119 for displaying the fuel quantity for an interval of about 5 seconds in an enlarged format as shown in FIG. 6 in a manner similar to the format employed for displaying the coolant temperature data TEMP.

In addition to ROM 11f, another read only memory could also be used for displaying the above described data in different formats as illustrated in FIG. 3 or 4 and in such instances the current time data, coolant temperature data, residual fuel quantity data, interior and exterior temperature data could be individually displayed in a desired location, format, size and color other than those described above.

The invention could also be further modified. For example, a plurality of read only memories is employed instead of the ROM 11f as a means for storing a display pattern data for the purposes of displaying data in a variety of formats and the microcomputer is programmed to selectively use one of such ROMs. Another modification would be to employ a plurality of memory elements in each of which display pattern data is stored and one of such memory elements is selected to allow the stored data to be decoded by the CPU during the time when it is executing the program so that a desired format is created.

Figure 20:
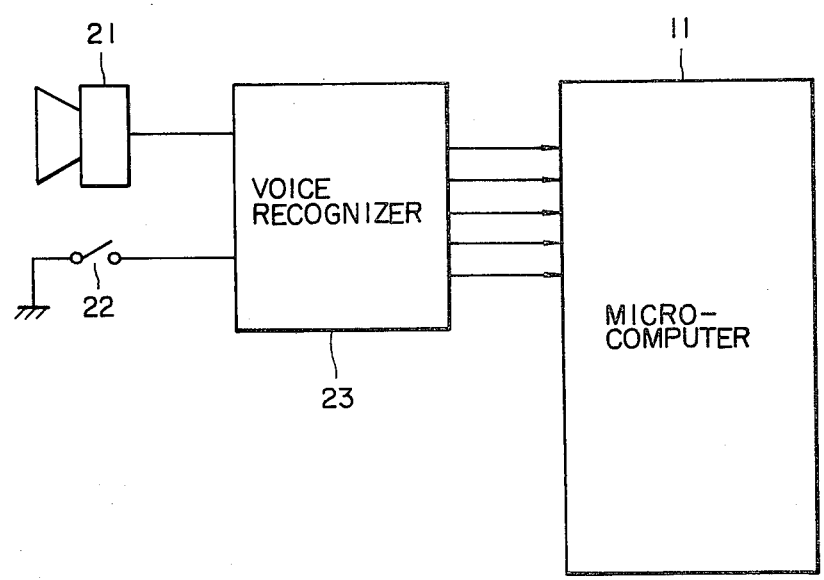
FIG. 20 is a block diagram of a modifed embodiment.

While the operation of any one of the pushbuttons on panel 9 results in the desired data being displayed in an enlarged format, the command signal could also be entered by the use of a microphone 21 and a voice recognizer 23 as shown in FIG. 20 instead of the various pushbuttons. In this modification, the vehicle driver gives vocal information by uttering "fuel", "coolant temperature", "time", "interior temperature", or "exterior temperature" into the microphone 21 with a built-in power switch 22 being turned on. The vocal analyzer 23 proceeds to analyze the vocal information given by vehicle driver and compares it with a set of stored information to detect a match between them. If a match is detected, the microcomputer execute the program as described above to enlarge the format of the displayed item addressed by the vehicle driver.

The foregoing description shows only preferred embodiments of the invention. Further modifications of the invention are apparent to those skilled in the art without departing from the scope of the invention which is only limited by the appended claims.

What is claimed is:

1. A method for displaying the operating parameters of a plurality of parts of a motor vehicle on a viewing screen, comprising the steps of:
   (a) constantly monitoring said operating parameters;
   (b) displaying the magnitudes of said monitored operating parameters as indication items in respective formats on said viewing screen;
   (c) detecting one or more of said monitored parameters which are abnormal;
   (d) deleting a portion of the displayed indication items excepting the item whose monitored parameter is detected as being abnormal; and
   (e) enlarging the displayed item whose monitored parameter is detected as being abnormal over an area including the area in which said portion has been displayed.

2. A method as set forth in claim 1, wherein the step (c) comprises the steps of sequentially checking said monitored parameters to see if each magnitude of the monitored parameters exceeds a predetermined critical value and the step (e) comprises alternately enlarging a plurality of the displayed items whose monitored parameters are simultaneously detected as abnormal.

3. A method as set forth in claim 1, further comprising the step of changing the color of the displayed item when the abnormal parameter is detected.

4. A method as set forth in claim 1, 2 or 3, further comprising the step of responding to a manual command signal by enlarging the format of an associated one of said displayed items.

5. A method as set forth in claim 4, wherein said responding step comprises:
   storing a plurality of data words in a memory representing different formats respectively for said displayed items;
   reading one of said data words out of said memory in response to said manual command signal; and
   modifying a parameter indicative signal derived from the step (a) in accordance with said format data word read out of the memory to display said modified signal in a format specified by said format data word.

6. A method as set forth in claim 1, 2 or 3, further comprising the step of generating a vocal warning announcement in response to said abnormal parameter being detected in the step (c).

7. A vehicle-mounted display system comprising:
   a display unit;
   first means for monitoring the operating parameters of various parts of the vehicle and generating display data words indicative of the magnitudes of the monitored operating parameters;
   second means for generating a format-specifying data word for each said monitored parameter and displaying said magnitudes on said display unit as indication items in a variable format as a function of said format-specifying data words;
   third means for detecting one or more of said monitored parameters which are abnormal; and
   fourth means for deleting a portion of the displayed items excepting the item whose monitored parameter is detected as being abnormal and modifying the format-specifying data word associated with said abnormal parameter to specify a larger format to cause the excepted item to be displayed in said larger format in an area covering the area to which said deleted portion is assigned.

8. A vehicle-mounted display system as set forth in claim 7, further comprising means for generating a vocal warning announcement in response to said detecting means.

9. A vehicle-mounted display system as set forth in claim 7, wherein said detecting means comprises means for sequentially monitoring the operating parameters of said vehicle parts and causing the magnitudes of the abnormal parameters to be displayed alternately when the abnormal parameters occur simultaneously in at least two vehicle parts.

10. A vehicle-mounted display system as set forth in claim 7, further comprising means for generating a manually responsive command signal for each of said parameters to convert an associated one of the format specifying data words into a different data word specifying an enlarged format and causing the displayed magnitude associated with said converted format specifying word to be displayed in an enlarged format.

11. A vehicle-mounted display system as set forth in claim 10, wherein said command signal generating means comprises a plurality of manually operated function keys respectively associated with the monitored operating parameters.

12. A vehicle-mounted display system as set forth in claim 10, wherein said command signal generating means comprises a vocal analyzer for generating said command signal in response to a vocal announcement.

13. A vehicle-mounted display system as set forth in claim 7, further comprising means for converting the color of the displayed abnormal parameter into a different color in response to said detecting means.

14. A method as set forth in claim 1, wherein the step (b) comprises providing a display of letters identifying the abnormal parameter and the step (e) comprises enlarging the size of said displayed letters.

15. A method as set forth in claim 1, wherein the step (b) comprises providing a display of an analog representation of said operating parameters on a graduated scale and the step (e) comprises enlarging the graduations of said scale of the analog representation whose operating parameter is abnormal.

16. A vehicle-mounted display system as set forth in claim 7, wherein said second means comprises means for providing a display of letters identifying the abnormal parameter and said fourth means comprises means for enlarging the size of said displayed letters.

17. A vehicle-mounted display system as set forth in claim 7, wherein said second means comprises means for providing a display of an analog representation of said operating parameters on a graduated scale and said fourth means comprises means for enlarging the graduations of said scale of the analog representation whose operating parameter is abnormal.

* * * * *